United States Patent
Wessels

(10) Patent No.: US 12,030,563 B1
(45) Date of Patent: Jul. 9, 2024

(54) WINCH SLIDE-OUT TRAILER UNDERCARRIAGE

(71) Applicant: Larry L. Wessels, Lakewood, CO (US)

(72) Inventor: Larry L. Wessels, Lakewood, CO (US)

(*) Notice: Subject to any disclaimer, the term of this patent is extended or adjusted under 35 U.S.C. 154(b) by 501 days.

(21) Appl. No.: 17/505,338

(22) Filed: Oct. 19, 2021

(51) Int. Cl.
*B62D 53/06* (2006.01)
*B62D 53/08* (2006.01)
*B62D 63/06* (2006.01)
*B66D 1/02* (2006.01)
*B66D 1/30* (2006.01)
*B66D 1/60* (2006.01)
*B66D 3/00* (2006.01)

(52) U.S. Cl.
CPC ......... *B62D 53/068* (2013.01); *B62D 53/067* (2013.01); *B66D 1/02* (2013.01); *B66D 1/30* (2013.01); *B66D 3/003* (2013.01); *B62D 53/0814* (2013.01); *B62D 53/0864* (2013.01); *B62D 63/061* (2013.01); *B66D 1/60* (2013.01)

(58) Field of Classification Search
CPC ................ B62D 53/067; B62D 53/068; B62D 53/0814; B62D 53/0864; B62D 63/061; B66D 3/003; B66D 1/60; B60D 1/015; B60D 1/52; B60D 1/54
See application file for complete search history.

(56) References Cited

U.S. PATENT DOCUMENTS

| | | | | |
|---|---|---|---|---|
| 4,365,820 A | * | 12/1982 | Rush | B62D 53/0864 280/476.1 |
| 4,955,629 A | * | 9/1990 | Todd, Jr. | B62D 53/067 280/411.1 |
| 5,507,514 A | * | 4/1996 | Jacques | B62D 53/067 280/411.1 |
| 2006/0076754 A1 | * | 4/2006 | Jamieson | B60D 1/075 280/476.1 |
| 2020/0231080 A1 | * | 7/2020 | Weatherby, III | B60P 1/6481 |

FOREIGN PATENT DOCUMENTS

GB  2264468 A  *  9/1993  ............. B62D 21/14

* cited by examiner

*Primary Examiner* — Minnah L Seoh
*Assistant Examiner* — Christopher B Wehrly
(74) *Attorney, Agent, or Firm* — Edwin H. Crabtree

(57) ABSTRACT

A winch assembly for moving a first fifth wheel outwardly from a first trailer and engaging a king pin on a second trailer. The winch assembly includes a pair of parallel, spaced apart rails mounted on the underside of the first trailer. A slide out frame is mounted between the rails and attached to a front axle and a real axle, with wheels. The slide out frame includes the first fifth wheel adapted for engaging the king pin on the front of a second trailer. The first fifth wheel is attached to a pair of first cables on winch drums, driven by winch motors. The winch motors are used for rotating cable drums for retracting the first fifth wheel along a length of the trailer. Also, a pair of second cables on winch drums, driven by winch motors, are attached to the slide out frame. The second cables are used to extend the first fifth wheel outwardly from the rear of the first trailer for engaging the fifth wheel to the second trailer.

8 Claims, 4 Drawing Sheets

WINCH SLIDE-OUT TRAILER UNDERCARRIAGE

This non-provisional patent application incorporates by reference, U.S. Pat. No. 5,853,057 to Larry L. Wessels, the inventor of the subject invention, with objects and advantages described herein.

BACKGROUND OF THE INVENTION (a) Field of the Invention

This invention relates to a highway first trailer with a tractor for pulling a second trailer therebehind and more trailers, and more particularly, but not by way of limitation, to a winch assembly mounted on a trailer undercarriage, with wheel axles attached to the rear of the first trailer. The undercarriage includes a fifth wheel for releasable attachment to a king pin mounted on a front of the second trailer.

(b) Discussion of Prior Art

In U.S. Pat. Nos. 5,314,201, 5,465,990, 5,564,727, 5,620,195, 5,578,890, 5,758,890, and 5,863,057, to the subject inventor, an all-pneumatic locking pin insertion and retraction system for a sliding undercarriage with a pair of tandem wheel axles is described for mounting under a semitrailer pulled by a tractor. The locking pin system provides for adjustment of the undercarriage along the length of the rear of the trailer for load balancing and adjusting the trailer's turning radius during city deliveries and cross country travel. The locking system includes an air pressure protection valve to prevent the operation of the system if the pressurized air source drops below a predetermined amount of air pressure. Also, a latching system is disclosed in the U.S. Pat. No. 5,758,890 patent. The subject matter found in the above mentioned patents is incorporated herein by reference and used in the operation of the subject invention to accomplish the unique features, advantages and objects as set forth.

SUMMARY OF THE INVENTION

In view of the foregoing, it is a primary objective of the subject invention to provide a first trailer with a rearward extension and forward retraction, slide-out winch assembly. The winch assembly is used for moving a rear axle frame with a fifth wheel into a rearward, extended position for attachment to and pulling a second trailer.

Another key object of the invention is the winch assembly provides for increased highway safety by helping prevent lateral movement and fish-tailing of the second trailer during highway travel. Also, the winch assembly can be used for pulling a third or more trailers. Further, the winch assembly eliminates the manhandled use of a dangerous converter dolly used to connect a second trailer to the rear of a first trailer, Still another object of the winch assembly, when not pulling a second trailer, can be retracted under the rear of the first trailer and adjusted for trailer loads thereon and adjusted for different trailer turning radius.

The winch assembly includes a pair of parallel, spaced apart rails mounted on the underside of the first trailer. A slide out frame is mounted between the rails and attached to a front axle and a real axle, with wheels. The slide out frame includes a first fifth wheel adapted for engaging a king pin on the front of a second trailer. The first fifth wheel is attached to a pair of first winch cables mounted on winch drums and driven by winch motors. The winch motors are used for rotating cable drums for retracting the first fifth wheel along a length of the trailer. Also, a pair of second winch cables mounted on winch drums and driven by winch motors are attached to a rear of the first trailer. The second cables are used to extend the first fifth wheel outwardly from the rear of the first trailer for engaging the fifth wheel to the second trailer.

These and other objects of the present invention will become apparent to those familiar with different types of trailer and semi-trailer undercarriages for pulling a second trailer when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject winch assembly mounted on a first trailer with a trailer fifth wheel, and in which.

DETAILED DESCRIPTION OF THE PREFERRED EMBODIMENTS

Figure 1:
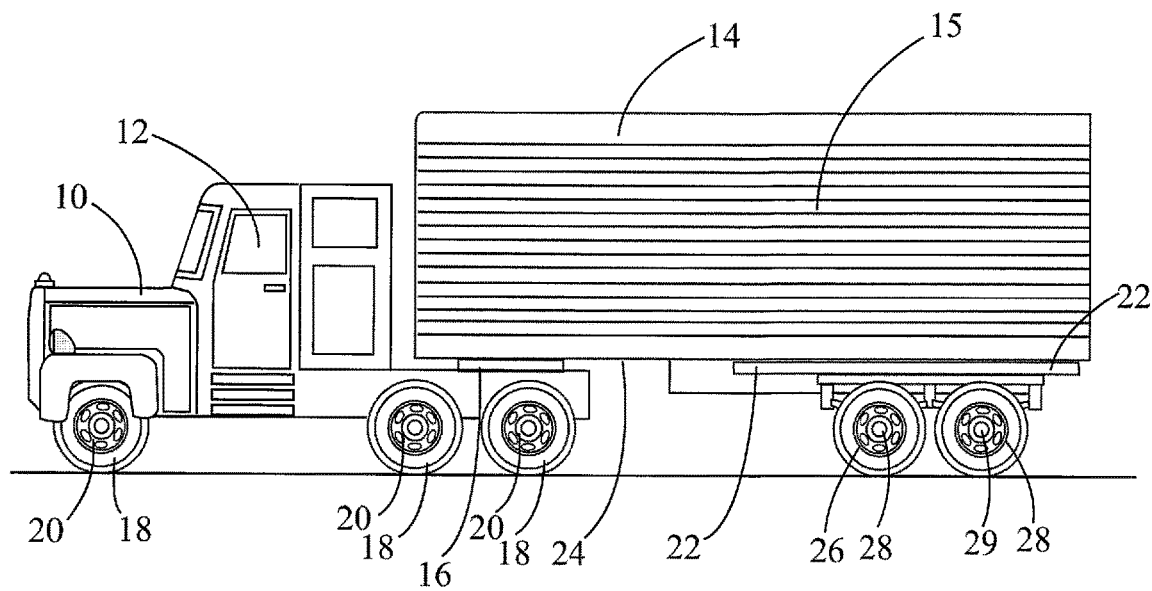
FIG. 1 is a side view of a highway tractor with the first trailer. The first trailer includes the subject winch assembly, a trailer fifth wheel and on a pair of axles with wheels. The first trailer adapted for pulling a second trailer.

In FIG. 1, a side view of a typical highway tractor 10, with cab 12, is shown pulling a first trailer 14, with a trailer body 15. The tractor 10 includes a fifth wheel 16 and wheels 18 with wheel axles 20.

The first trailer 14 includes a pair of spaced apart, parallel rails 22 mounted along a length and rear of trailer frame 24. The rails 22 can be seen more clearly in FIG. 2. The first trailer 14 includes a front axle 28 with front wheels 26 and a rear axle 29 with rear wheels 27.

Figure 2:
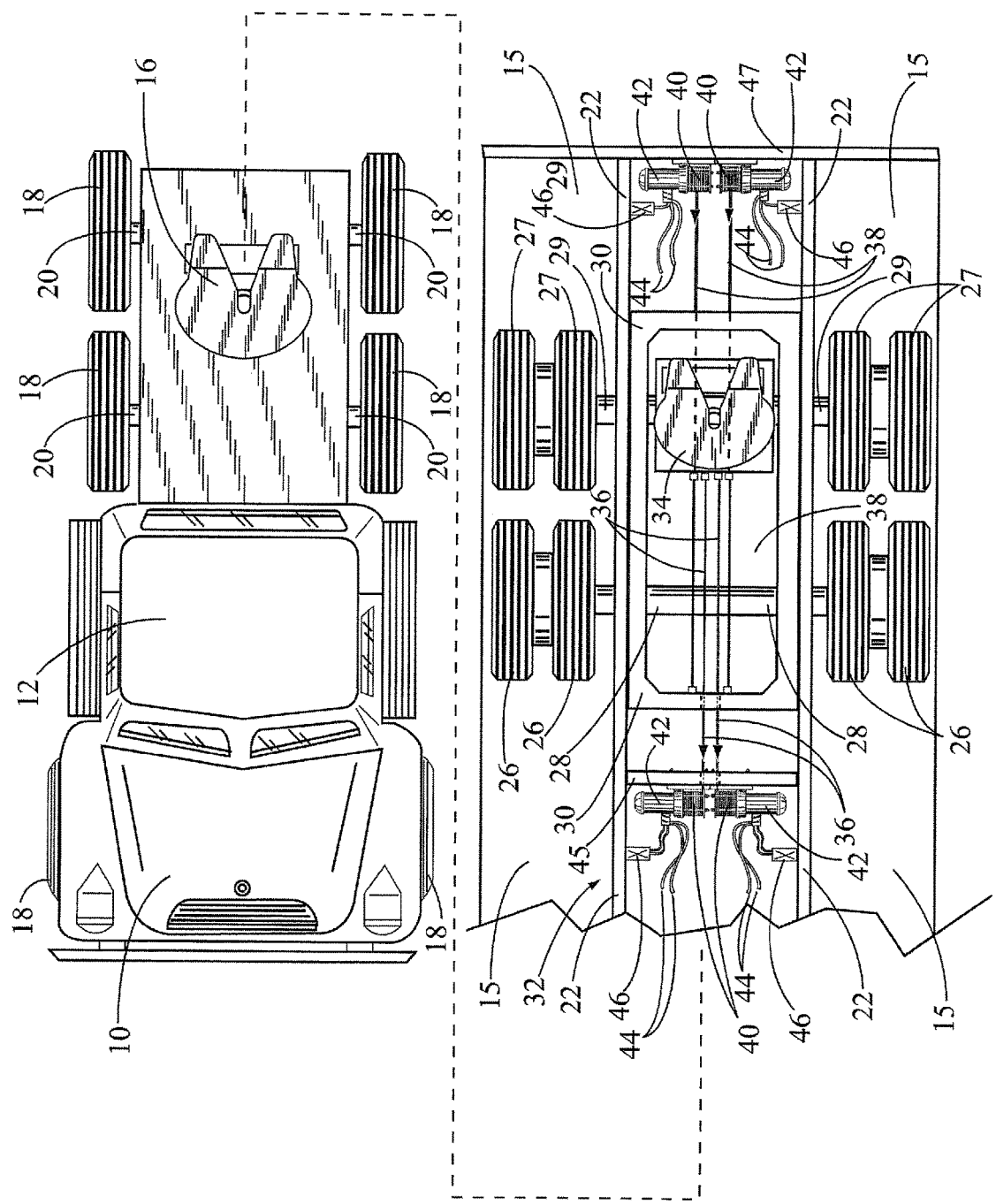
FIG. 2 is a top view of the highway tractor, as shown in FIG. 1, with a trailer body removed for viewing the winch assembly and axles with wheels.

In FIG. 2, a top view of the highway tractor 10 is shown with the trailer body 15 removed for viewing the first trailer rails 22 with the front wheels 26 and the front axle 28 and the rear wheels 27 and the rear axle 28.

In this drawing, a winch assembly is shown having a general reference numeral 32. The winch assembly 32 includes a slide-out frame 30 disposed between the rails 22. A trailer first fifth wheel 34 is attached to a pair of first winch cables 36 and a pair of second winch cables 38. The first and second winch cables 36 and 38 are mounted on a pair of winch drums 40 rotated by winch motors 42, with electric leads 44.

The winch drums 40, with first cables 36, are attached to a cross brace 45 disposed between the rails 22. The winch drums 40, with second cables 38, are attached to a rear end 47 of the trailer body 15. The winch motors 42 include a built-in servo and a potentiometer for accurate movement and position of the trailer fifth wheel 34. The electric leads 44 are attached to a control box inside the cab 12. The control box is used for operating the trailer undercarriage 32. A weight sensor 46 can also be connected to winch motors 44 for providing weight measurement on the trailer to the control box.

Figure 3:
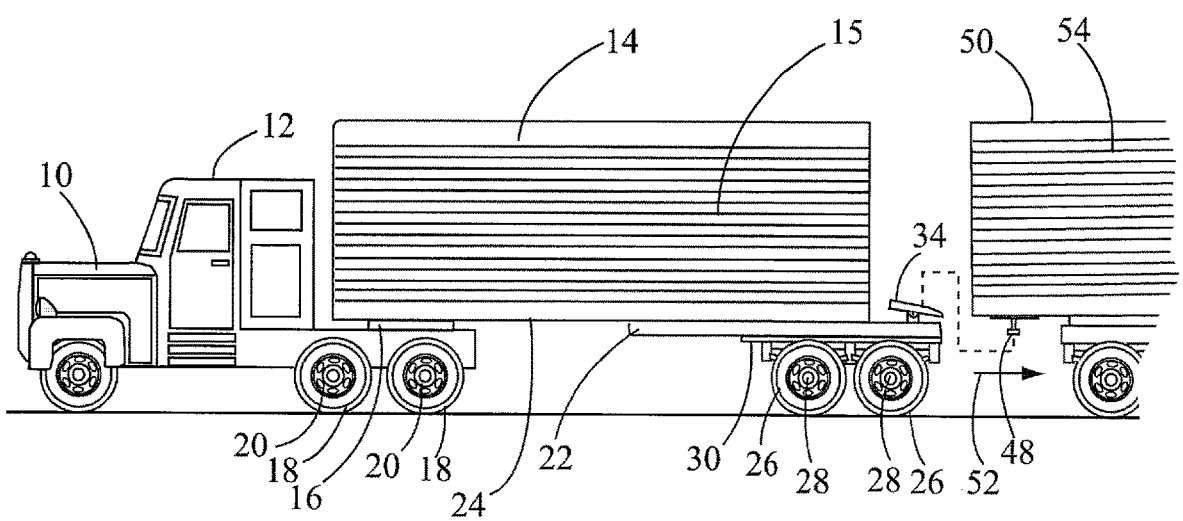
FIG. 3 is another side view of the highway truck with the winch assembly used for extending a rear axle outwardly from the first trailer for engaging a king pin on a second trailer.

In FIG. 3, another side view of the highway truck 10 is shown wherein the second winch cables 38 have moved the rear wheels 27 and rear axle 29 outwardly from the rear or aft end of the first trailer. In this drawing, the trailer first fifth wheel 34 is position for engaging a king pin 48 on a second trailer 50, as indicated by arrow 52. The second trailer 50 includes a second trailer body 54.

Figure 4:
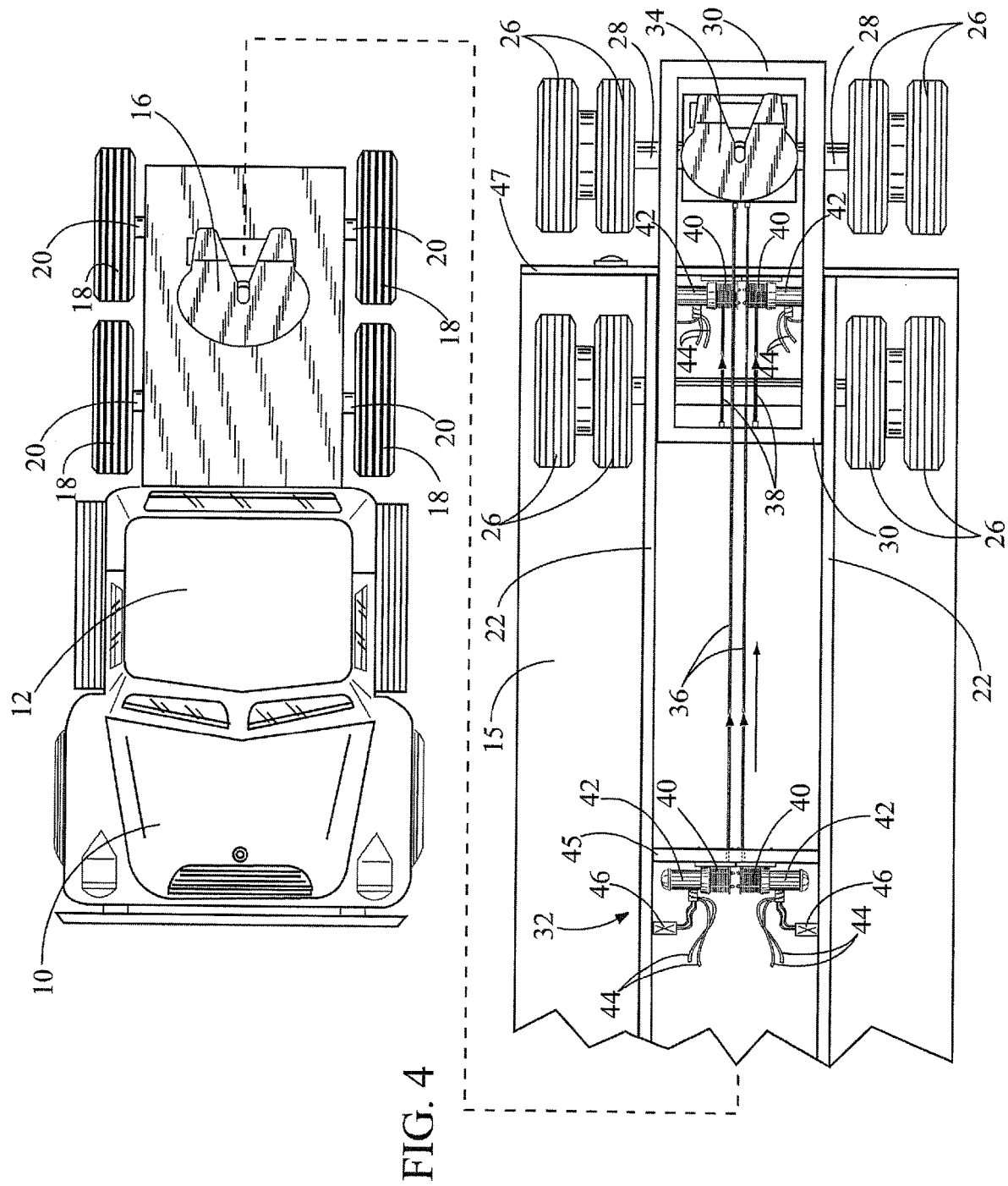
FIG. 4 is a top view of the highway truck, as shown in FIG. 3, with the first trailer body removed for viewing the rear axle extending outwardly from the rear of the first trailer and engaging the king pin on the second trailer

In FIG. 4, a top view of the highway truck 10 is illustrated, as shown in FIG. 3, with the first trailer body 15 removed for viewing the rear axle 29 and rear wheels 27 extending outwardly from the rear of the first trailer 14 using the second winch cables 38 attached to the cable drums 40. The first fifth wheel 34 is now positioned for engaging the king pin 48 on the second trailer 50.

Figure 5:
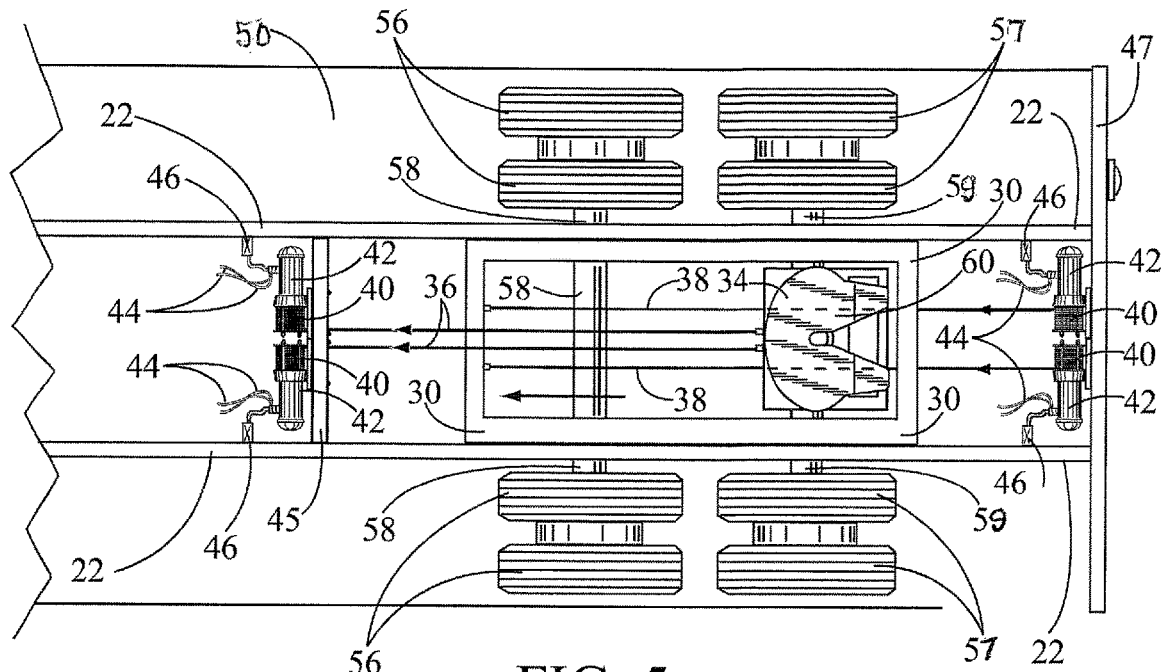
FIG. 5 is a top view of a second trailer with a trailer body removed to exposed the trailer's undercarriage, with tandem axles and the winch assembly holding a second trailer fifth wheel in a retracted position on the second trailer.

In FIG. 5, a top view of the second trailer 50 is shown with the second trailer body 54 removed to exposed the trailer's undercarriage. In this drawing, the second trailer front wheels 56 and front axle 58 and second trailer rear wheels 57 and rear axle 59 are in a retracted position on the second trailer 50 using the first winch cables 38. The second trailer 50 also includes parallel rails 22, a cross brace 45, and a slide-out frame 30. The winch assembly 32 on the second trailer 50 operates in the same manner as the winch assembly 32 on the first trailer 14.

Figure 6:
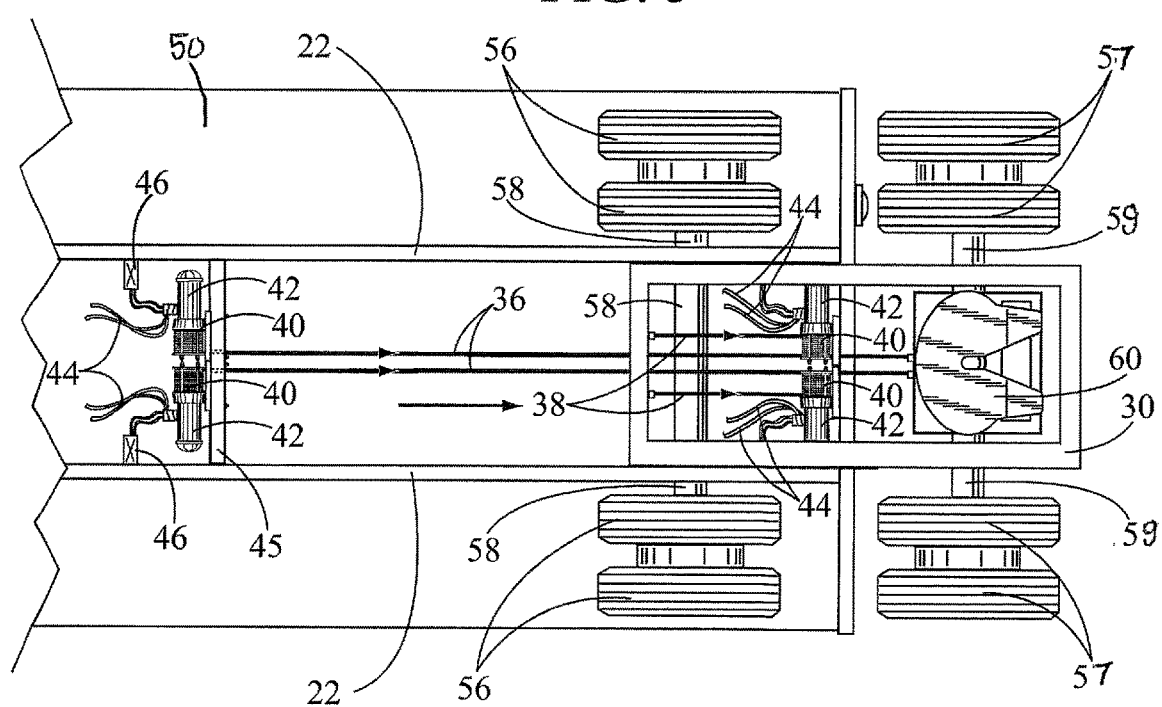
FIG. 6 is another top view of the second trailer with the trailer body removed. In this drawing, the winch assembly has extended the second trailer fifth wheel outwardly from the rear of the trailer for engaging a king pin on a third trailer.

In FIG. 6, another top view of the second trailer 50 is shown with the trailer body 54 removed. In this drawing, the second winch cables 36 have extended the second trailer fifth wheel 60 outwardly from the rear of the second trailer 50 for engaging a third king pin on a third trailer. The third king pin and third trailer are not shown in the drawings.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The invention claimed is:

1. A winch assembly mounted on a first trailer pulled by a highway tractor and adapted for attaching a rear of the first trailer to a front of a second trailer, the winch assembly comprising:
   a pair of parallel rails mounted on a rear of an underside of the first trailer;
   a front axle, with front wheels, mounted on the rails;
   a rear axle, with rear wheels, mounted on the rails;
   a first slide-out frame mounted between the parallel rails;
   a pair of first winch cables mounted on first cable drums with winch motors, the first cable drums attached to a front portion of the parallel rails;
   a pair of second winch cables mounted on second cable drums with winch motors, the second cable drums attached to a rear portion of the first trailer;
   a trailer first fifth wheel mounted on the first slide-out frame and attached to the pair of first winch cables and attached to the pair of second winch cables, the trailer first fifth wheel adapted for engaging a king pin on the front of a second trailer; and
   whereby the first winch cables used for retracting the trailer first fifth wheel and front and rear axles with tires under the underside of the first trailer, the second winch cables used for extending the trailer first fifth wheel and rear axles with tires outwardly from a rear of the first trailer for engaging a king pin on the second trailer.

2. The winch assembly as described in claim 1 further including a servo mounted on the winch motors for controlling the movement of the trailer first fifth wheel.

3. The trailer undercarriage as described in claim 2 further including a potentiometer attached to the servo and the winch motors for measuring the movement of the trailer first fifth wheel.

4. The trailer undercarriage as described in claim 2 further including a weight sensor connected to the winch motors for measuring the weight load on the first trailer.

5. A winch assembly mounted on a second trailer pulled by a first trailer and a highway tractor and adapted for attaching a rear of the second trailer to a front of a third trailer, the winch assembly comprising:
   a pair of parallel rails mounted on a rear of an underside of the second trailer;
   a front axle, with front wheels, mounted on the rails;
   a rear axle, with rear wheels, mounted on the rails;
   a second slide-out frame mounted between the parallel rails;
   a pair of first winch cables mounted on first cable drums with winch motors, the first cable drums attached to a front portion of the parallel rails;
   a pair of second winch cables mounted on second cable drums with winch motors, the second cable drums attached to a rear portion of the first trailer;
   a trailer second fifth wheel mounted on the second slide-out frame and attached to the pair of first winch cables and attached to the pair of second winch cables, the trailer second fifth wheel adapted for engaging a king pin on the front of a third trailer; and
   whereby the first winch cables used for retracting the trailer second fifth wheel and front and rear axles with tires under the underside of the second trailer, the second winch cables used for extending the trailer second fifth wheel and rear axles with tires outwardly from a rear of the second trailer for engaging the king pin on the third trailer.

6. The winch assembly as described in claim 5 further including a servo mounted on the winch motors for controlling the movement of the trailer first fifth wheel.

7. The trailer undercarriage as described in claim 6 further including a potentiometer attached to the servo and the winch motors for measuring the movement of the trailer first fifth wheel.

8. The trailer undercarriage as described in claim 6 further including a weight sensor connected to the winch motors for measuring the weight load on the first trailer.

* * * * *